US012669235B2

(12) United States Patent
Joseph et al.

(10) Patent No.: US 12,669,235 B2
(45) Date of Patent: Jun. 30, 2026

(54) SYSTEM FOR GENERATING COLLIMATED NON-COHERENT BRIGHT LIGHT USING A PLURALITY OF OPTICAL ELEMENTS

(71) Applicant: Disney Enterprises, Inc., Burbank, CA (US)

(72) Inventors: Daniel M. Joseph, Winter Garden, FL (US); Veronica Chen, Stanford, FL (US); Jessica Klouda, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 283 days.

(21) Appl. No.: 18/617,648

(22) Filed: Mar. 26, 2024

(65) Prior Publication Data

US 2025/0305659 A1 Oct. 2, 2025

(51) Int. Cl.

| | |
|---|---|
| ***F21S 41/176*** | (2018.01) |
| ***F21V 5/04*** | (2006.01) |
| ***F21V 9/14*** | (2006.01) |
| ***F21V 9/30*** | (2018.01) |
| ***F21V 13/12*** | (2006.01) |
| *F21Y 115/30* | (2016.01) |

(52) U.S. Cl.

CPC ................ *F21V 13/12* (2013.01); *F21V 5/04* (2013.01); *F21V 9/14* (2013.01); *F21V 9/30* (2018.02); *F21Y 2115/30* (2016.08)

(58) Field of Classification Search

CPC ... F21V 13/12; F21V 5/04; F21V 9/14; F21V 9/30; F21V 29/502; F21Y 2115/30; F21W 2131/406

See application file for complete search history.

(56) References Cited

U.S. PATENT DOCUMENTS

2013/0003026 A1* 1/2013 Rothaar ............. G03B 21/2086 353/85

2015/0252974 A1* 9/2015 Hu ......................... F21S 41/675 362/510

OTHER PUBLICATIONS

Chi, et al., “Phosphorous diffuser diverged blue laser diode for indoor lighting and communication,” Scientific Reports 5:18690, 9 pages (2015).

* cited by examiner

*Primary Examiner* — Howard D Brown, Jr.

(74) *Attorney, Agent, or Firm* — Foley & Lardner LLP

(57) ABSTRACT

A system, comprising: a first array of lasers; a first linear polarizer; a second array of lasers; a second linear polarizer provided at an angle with respect to the first linear polarizer; a first beamsplitter coupled to the first linear polarizer; a phosphor assembly; a collimator lens; a third linear polarizer; a second beamsplitter coupled to the third linear polarizer; and a telephoto lens.

20 Claims, 3 Drawing Sheets

SYSTEM FOR GENERATING COLLIMATED NON-COHERENT BRIGHT LIGHT USING A PLURALITY OF OPTICAL ELEMENTS

BACKGROUND

A laser is a device that emits light through a process of optical amplification. The process of optical amplification may be based on a stimulated emission of electromagnetic radiation. Unlike other sources of light, a laser produces a narrow beam of light by way of spatial coherence. The narrow beam may be utilized in different applications.

SUMMARY

In some implementations, a system, comprising: a first array of lasers adapted to emit first light; a first linear polarizer adapted to receive the first light and provide the first light; a second array of lasers adapted to emit second light; a second linear polarizer adapted to receive the second light and provide the second light; a first beamsplitter adapted to: receive the first light from the first linear polarizer and transmit the first light as transmitted first light, and receive the second light from the second linear polarizer and reflect the second light as reflected second light; a third linear polarizer adapted to receive the transmitted first light and the reflected second light and provide the transmitted first light and the reflected second light; a phosphor assembly adapted to: receive the transmitted first light and the reflected second light, and generate non-coherent light based on a combination of the transmitted first light and the reflected second light; a collimator lens adapted to receive the non-coherent light and collimate the non-coherent light to generate collimated non-coherent light; a second beamsplitter adapted to receive the collimated non-coherent light and reflect the collimated non-coherent light; and a telephoto lens adapted to: receive the collimated non-coherent light from the second beamsplitter, focus the collimated non-coherent light to obtain focused collimated non-coherent light, and output the focused collimated non-coherent light.

In some implementations, a system, comprising: a first array of lasers; a first linear polarizer; a second array of lasers; a second linear polarizer provided at an angle with respect to the first linear polarizer; a first beamsplitter coupled to the first linear polarizer; a phosphor assembly; a collimator lens; a third linear polarizer; a second beamsplitter coupled to the third linear polarizer; and a telephoto lens.

In some implementations, A system, comprising: a first array of lasers adapted to emit first light; a first linear polarizer adapted to receive the first light and provide the first light; a second array of lasers adapted to emit second light; a second linear polarizer adapted to receive the second light and provide the second light; a first beamsplitter, coupled to the first linear polarizer, adapted to: receive the first light from the first linear polarizer and transmit the first light as transmitted first light, and receive the second light from the second linear polarizer and reflect the second light as reflected second light; a third linear polarizer adapted to receive the transmitted first light and the reflected second light and provide the transmitted first light and the reflected second light; a phosphor assembly adapted to: receive the transmitted first light and the reflected second light, and generate non-coherent light based on a combination of the transmitted first light and the reflected second light; a first lens adapted to receive the non-coherent light and collimate the non-coherent light to generate collimated non-coherent light; a second beamsplitter, coupled to the third linear polarizer, adapted to receive the collimated non-coherent light and reflect the collimated non-coherent light; and a second lens adapted to receive the collimated non-coherent light from the second beamsplitter and output focused collimated non-coherent light.

DETAILED DESCRIPTION

Figure 1:
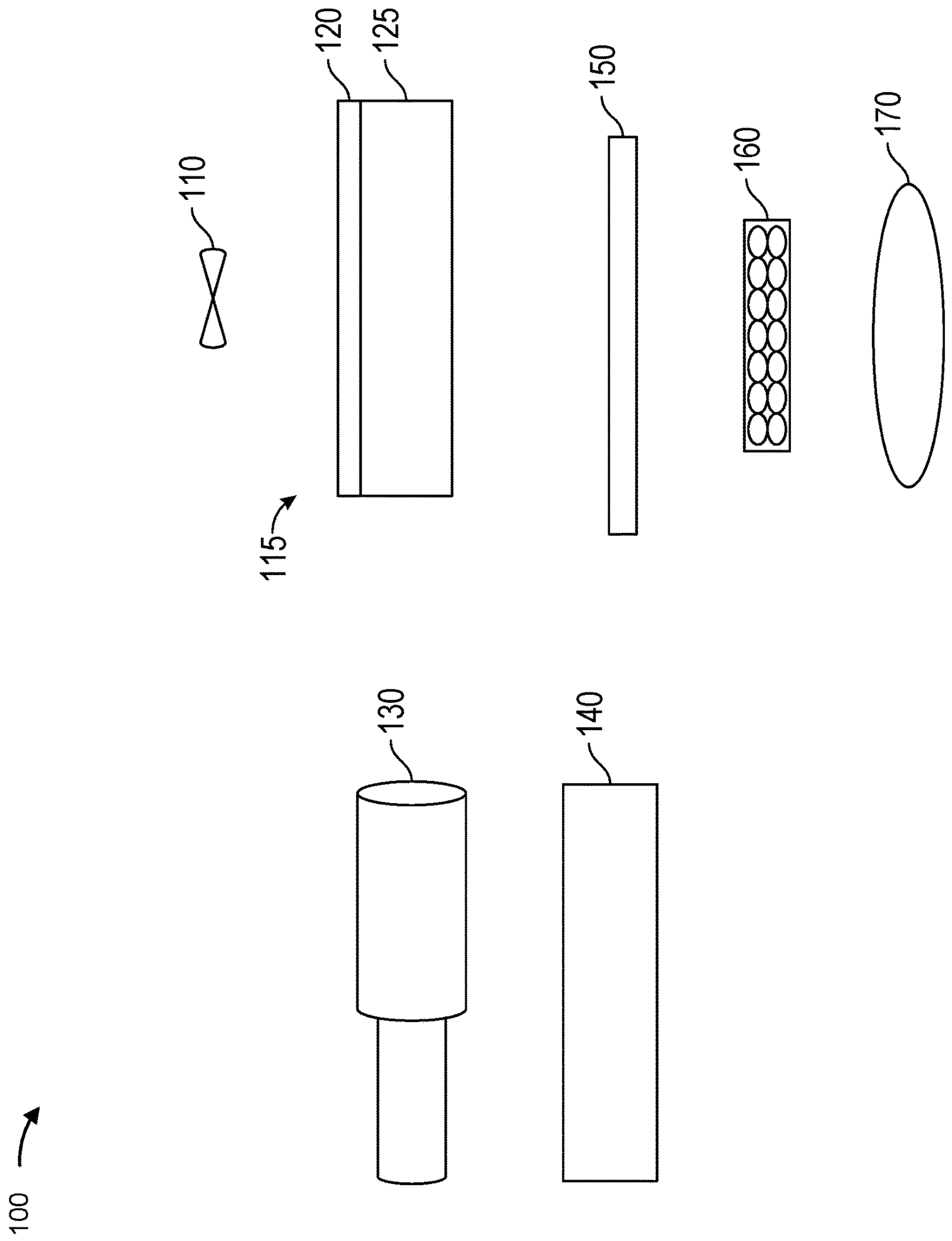
FIG. 1 is a diagram of an example system described herein.

The following detailed description of example implementations refers to the accompanying drawings. The same reference numbers in different drawings may identify the same or similar elements.

Special lighting and visual effects may be provided at a venue that includes one or more guests. The special lightning and visual effects may be designed to generate bright directional light (e.g., a white light beam). Typically, such bright directional light is generated by using lasers. However, using lasers in this manner presents multiple technical problems.

One technical problem relates to the fact that generating such bright directional light (e.g., the white light beam) involves the use of red laser light, green laser light, and blue laser light. In other words, the red laser light, the green laser light, and the blue laser light may be aligned to generate white light (or light appearing to be white light). However, in the event of a misalignment, the white light may be separated into the red laser light, the green laser light, and the blue laser light.

Accordingly, the technical problem may include maintaining an alignment of the red laser light, the green laser light, and the blue laser light. Additionally, generating the white light in this manner involves the use of steam or fog to make the white light visible.

An additional problem is that generating such bright directional light using lasers involves the deployment of protective equipment in the venue, due to the coherent nature of laser light. For example, the protective equipment may be deployed in the venue to facilitate proper use of the lasers in the venue. Configuring (or setting up) the protective equipment in the venue may be a time-consuming and complicated process. Setting up the protective equipment may include concealing the protective equipment in the venue. Accordingly, the additional technical problem may include configuring the protective equipment in the venue. In some situations, one option may include converting coherent laser light to non-coherent directional light.

Further to the additional technical problem of configuring the protective equipment, the protective equipment is typically expensive. Light emitting diodes (LEDs) may provide an option that does not involve the use of the protective equipment. However, light generated by LEDs may not sufficiently bright and/or is not sufficiently focused. Accordingly, a need exists for generating bright non-coherent light (e.g., non-coherent white light) in a manner that is independent of alignment (of red laser light, green laser light, and blue laser light), that is efficient, and that is cost-effective.

Implementations described herein are directed to a system that generates collimated non-coherent bright light in an environment. The environment may include a venue, an establishment providing different types of services, a home, a neighborhood (e.g., residential or industrial), among other examples. The establishment may include a hotel, a restaurant, among other examples.

The system may include multiple arrays of lasers, multiple linear polarizers, multiple beamsplitters, a phosphor assembly, a collimator lens, and a telephoto lens. The lasers (of the multiple arrays of lasers) may be adapted to generate light at a wavelength or a range or band of wavelengths perceived as a single color. For example, the single color may be blue.

The light may be provided to the phosphor assembly via the linear polarizers and the beamsplitters. As an example, the light generated by a first array of lasers may be provided to the phosphor assembly via the linear polarizers and the beamsplitters. The light generated by a second array of lasers may be reflected by a beamsplitter and provided to the phosphor assembly via another beamsplitter as described herein.

The phosphor assembly may include a phosphor (e.g., a layer of phosphor) and a heatsink component. The phosphor may perform light conversion on the light from the arrays of the laser (e.g., change the color of the light). For example, the phosphor may transform the wavelength of the light into another wavelength, thereby changing the color of the light. For instance, the phosphor may transform the wavelength of the blue light into the wavelength of the white light (e.g., transform the wavelength of the blue light to match the wavelength of the white light). In this regard, the phosphor may be selected to perform the light conversion to emit white light based on the blue light. By causing multiple arrays of lasers to emit light that is provided to the phosphor, an intensity of light received by the phosphor may be significantly increased compared to light received by the phosphor from a single laser or from a single array of laser. The light emitted by the phosphor may be increased compared to light that would have been emitted by the phosphor based on receiving light from a single laser or from a single array of laser.

Additionally, the phosphor may convert the coherent light (from the arrays of lasers) into non-coherent light. By converting the coherent light into non-coherent light, implementations described herein may generate light that mitigates the deployment of protective equipment in the environment. In other words, the non-coherent light may mitigate concerns related to using lasers in the environment.

The heatsink component may absorb heat generated by the light received from the arrays of laser. Accordingly, the heatsink component may prevent the phosphor from experiencing excessive heat that may damage the phosphor. In some situations, a cooling component may be provided with the phosphor assembly. The cooling component may cause the phosphor assembly to be constantly cooled.

In some examples, the cooling component may include an air cooling component, such as a fan. Additionally, or alternatively, the cooling component may be a liquid cooling component (e.g., to cool by way of convection or circulation of a liquid). The collimated lens may receive the light generated by the phosphor and collimate the light to obtain collimated light. The collimated light may be reflected by an additional beamsplitter and provided to the telephoto lens.

The telephoto lens may focus the collimated light. For example, the telephoto lens may output a focused beam of light that remains focused over a long distance (e.g., a distance that satisfies a distance threshold). For example, the telephoto lens may cause the focused beam of light to remain focused for over approximately two miles. The focused beam of light may have a diameter of approximately two to three millimeters.

Based on the foregoing, implementations described herein utilize multiple arrays of lasers that emit light (e.g., blue light) that is reflected through beamsplitters (e.g., mirrors) and polarizers to a yellow white phosphor that emits white light based on the blue light. The white light (emitted by the phosphor) may be exceedingly bright and a perfectly point source white light. Additionally, the white light emitted by the phosphor is not coherent unlike the light emitted by the lasers.

This bright white point source of light is provided as an input to the telephoto lens to generate a very adjustable column of white light. The white light may be up to five thousand lumens and may be a diameter of three inches beam that remains a focused three inch beam for over 2 miles. Accordingly, generating bright non-coherent (e.g., non-coherent white light) in a manner that is independent of alignment (of red laser light, green laser light, and blue laser light), that is efficient, and that is cost-effective.

While examples described herein relate to using blue light to generate white light, implementations described herein may be applicable to using other colors to generate different colors. For example, the array of lasers may be adapted to generate a color other than blue (e.g., green) and the phosphor assembly may be adapted to perform light conversion to emit light of a different color (e.g., of a different wavelength). In other words, the phosphor may be chosen to efficiently convert the particular laser wavelength chosen to a selected wavelength.

FIG. 1 is a diagram of an example system 100 described herein. As shown in FIG. 1, system 100 may include various components, such as a cooling component 110, a phosphor assembly 115 that includes a heatsink component 120 and a phosphor 125, a telephoto lens 130, a beamsplitter 140, a linear polarizer 150, an array of lasers 160, and a collimator lens 170. The components of system 100 may form a display system.

Cooling component 110 may cool phosphor assembly 115 (e.g., may cool heatsink component 120). For example, cooling component 110 may provide above phosphor assembly 115 or one or more sides of phosphor assembly 115 to constantly cool phosphor assembly 115. In some examples, cooling component 110 may include an air cooling component, such as a fan. Additionally, or alternatively, cooling component 110 may be a liquid cooling component (e.g., to cool by way of convection or circulation of a liquid).

Heatsink component 120 may absorb heat generated by light received by phosphor 125. Heatsink component 120 may include material with high thermal conductivity (e.g., thermal conductivity that satisfy a thermal conductivity threshold). For example, heatsink component 120 may include brass, copper, aluminum, among other examples of materials that are thermally conductive. In some situations, heatsink component 120 may be coupled with phosphor 125.

Phosphor 125 may perform light conversion on light from array of lasers 160. In this regard, phosphor 125 may include a light conversion agent, such as a mix of powders, a ceramic phosphor converter, cerium, among other examples. Phosphor 125 may transform the wavelength of the light into another wavelength. For instance, phosphor may transform the wavelength of blue light into the wavelength of the white light. In some situations, phosphor 125 may be a yellow (or white) phosphor that performs light conversion on blue light to emit white light.

Phosphor 125 may serve as a bounce surface (or a reflective surface). For example, phosphor 125 may bounce (or reflect) the light from array of lasers 160. While examples described herein are directed to a yellow phosphor that performs light conversion from blue light to white light, other phosphors may be used to perform light conversion to different light colors.

In addition to performing light conversion, phosphor 125 may convert the light for array of lasers 160 from coherent light to non-coherent light. For example, phosphor 125 may include material that converts coherent light of array of lasers 160 into non-coherent light. In other words, phosphor 125 may increase the measure of divergence of the coherent light.

Telephoto lens 130 may focus light emitted by phosphor 125 (e.g., focus light reflected by phosphor 125). For example, telephoto lens 130 may focus the light into a light beam with a diameter of approximately two to three millimeter. Telephoto lens 130 may enable the light to remain focused over a long distance (e.g., a distance that satisfies a distance threshold). A size of telephoto lens 130 (e.g., a length) may be selected to meet the needs of a particular application involving telephoto lens 130. For example, telephoto lens 130 (e.g., a length therefore) may be selected to meet the needs of system 100. For instance, a length of telephoto lens 130 may be selected to meet a selected beam diameter.

In some examples, beamsplitter 140 may reflect light received from array of lasers 160 (e.g., reflect light of a first wavelength). Alternatively, beamsplitter 140 may reflect light received from phosphor assembly 115. The light received from array of lasers 160 may be of a first wavelength while the light received from phosphor assembly 115 may be of a second wavelength. For example, the first wavelength may be associated with blue light and the second wavelength may be associated with bright light (e.g., white light).

Linear polarizer 150 (or linear polarizer element) linearly polarizes received by linear polarizer 150. The light may be received from array of lasers 160 and/or from phosphor 125. For example, linear polarizer 150 allows light of a first linear polarization (either horizontal or vertically polarized light) to pass, while discarding light of a second linear polarization. In some situations, linear polarizer 150 may decrease an intensity of the light.

In some situations, linear polarizer 150 may be combined with beamsplitter 140. For example, linear polarizer 150 may be provided within a distance threshold of beamsplitter 140. In some examples, linear polarizer 150 may be coupled with beamsplitter 140. For example, a surface of linear polarizer 150 may be in contact with (or substantially in contact with) a surface of beamsplitter 140.

Array of lasers 160 may include multiple lasers. The lasers may emit light of a selected wavelength. For example, the lasers may emit blue light. In some situations, a power of array of lasers 160 may be approximately 20 watts. While examples herein have described in connection with lasers emitting blue light, the lasers may emit light of other colors. Collimator lens may receive light (e.g., phosphor 125) and may emit collimated light or emit substantially collimated light.

The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example component may perform one or more functions described as being performed by another set of devices of the example component.

Figure 2:
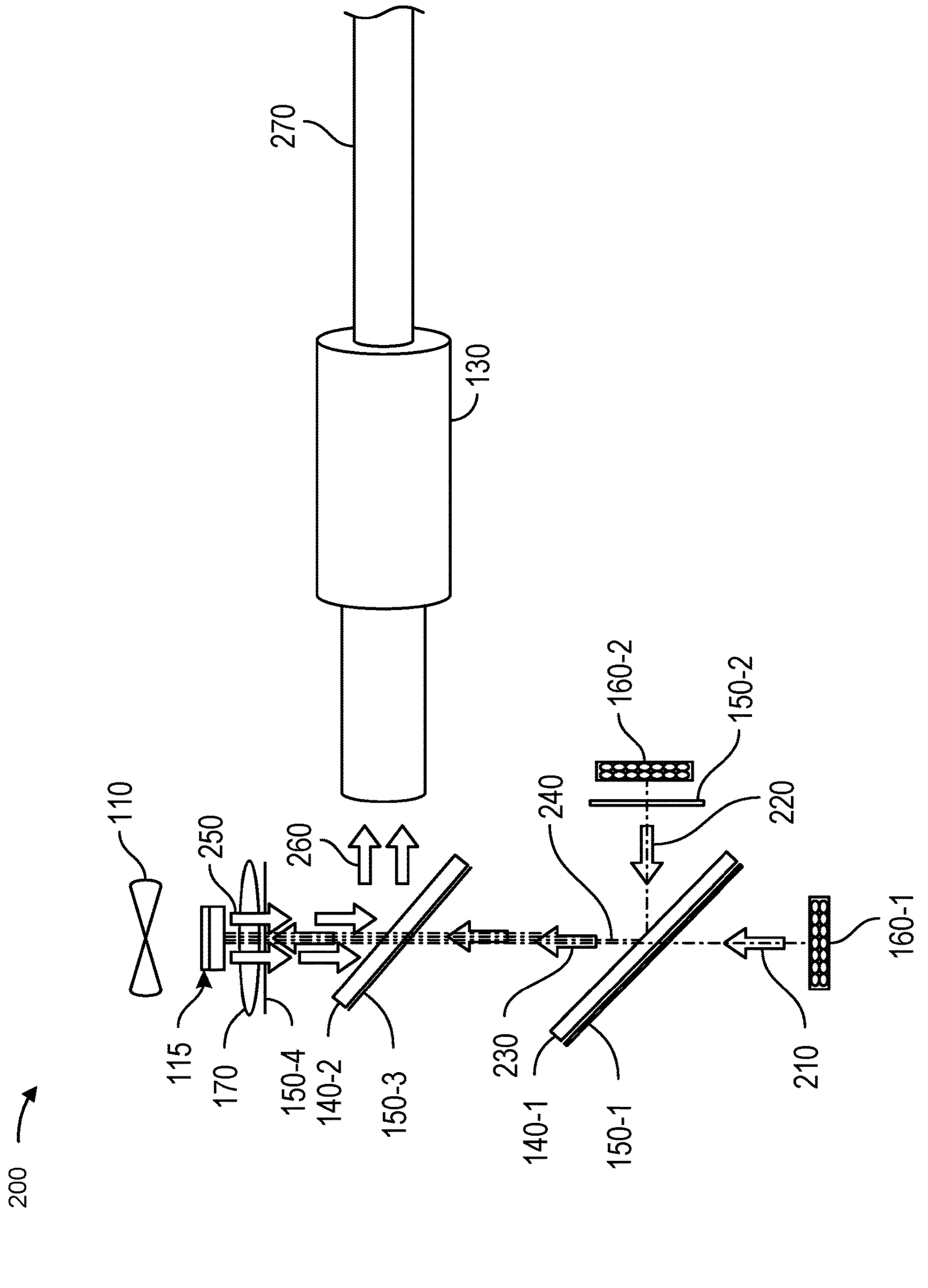
FIG. 2 is a diagram of an example configuration of the example system described herein.

FIG. 2 is a diagram of an example configuration 200 of system 100 described herein. Elements of FIG. 1, included in FIG. 2, have been described above. As shown in FIG. 2, system 100 may include multiple beamsplitters 140, multiple linear polarizers 150, and multiple array of lasers 160. As shown in FIG. 2, the elements of FIG. 1 may be provided at various distances from each other. As shown in FIG. 2, a first array of lasers 160-1 may be provided at an orthogonal angle with respect to a second array of lasers 160-2. A first linear polarizer 150-1 may be provided at an angle with respect to first array of lasers 160-1. The angle may be approximately 30 degrees to approximately 45 degrees.

A second linear polarizer 150-2 may be parallel to second array of lasers 160-2. Additionally, second linear polarizer 150-2 may be provided at an angle with respect to first linear polarizer 150-1. The angle may be approximately 30 degrees to approximately 45 degrees. Based on second linear polarizer 150-2 being provided at an angle with respect to first linear polarizer 150-1, first beamsplitter 140-1 may appear as an opaque surface to second array of lasers 160-2.

First beamsplitter 140-1 may be parallel to first linear polarizer 150-1. As shown in FIG. 2, first beamsplitter 140-1 may be provided within a distance threshold of first linear polarizer 150-1. As shown in FIG. 2, a third linear polarizer 150-3 and a second beamsplitter 140-2 may be parallel to first linear polarizer 150-1 and first beamsplitter 140-1. Third linear polarizer 150-3 may be provided within a distance threshold of second beamsplitter 140-2.

A fourth linear polarizer 150-4 and collimator lens 170 may be provided at an angle with respect to third linear polarizer 150-3 and second beamsplitter 140-2. The angle may be approximately 30 degrees to approximately 45 degrees. Additionally, fourth linear polarizer 150-4 and collimator lens 170 may be parallel to first array of lasers 160-1. Collimator lens 170 may be provided within a distance threshold of fourth linear polarizer 150-4.

Phosphor assembly 115 may be parallel to fourth linear polarizer 150-4 and collimator lens 170. As shown in FIG. 2, multiple elements may be provided between phosphor assembly 115 and first array of lasers 160-1. The multiple elements may include first linear polarizer 150-1, first beamsplitter 140-1, third linear polarizer 150-3, second beamsplitter 140-2, fourth linear polarizer 150-4, and collimator lens 170.

As shown in FIG. 2, first array of lasers 160-1 may generate first light 210. In some examples, first light 210 may be blue light and a power of first light 210 may be approximately 20 watts. First linear polarizer 150-1 may receive first light 210 and provide first light 210 to first beamsplitter 140-1. In some situations, first linear polarizer 150-1 may reduce the power (or intensity) of first light 210 prior to providing first light 210 to first beamsplitter 140-1.

Second array of lasers 160-2 may generate second light 220. In some examples, second light 220 may be blue light and a power of second light 220 may be approximately 20 watts. Second linear polarizer 150-2 may receive second light 220 and provide second light 220 to first beamsplitter 140-1. In some situations, second linear polarizer 150-2 may reduce the power (or intensity) of second light 220 prior to providing second light 220 to first beamsplitter 140-1.

First beamsplitter 140-1 may receive first light 210 from first linear polarizer 150-1 and transmit first light 210 as transmitted first light 230. First beamsplitter 140-1 may receive second light 220 from second linear polarizer 150-2 and reflect second light 220 as reflected second light 240. Based on second linear polarizer 150-2 being provided at an angle with respect to first linear polarizer 150-1, first beamsplitter 140-1 may appear as an opaque surface to second array of lasers 160-2. Based on first beamsplitter 140-1 appearing as an opaque surface, second light 220 may be reflected by first beamsplitter 140-1 as reflected second light 240.

As shown in FIG. 2, third linear polarizer 150-3 may receive transmitted first light 230 and reflected second light 240 and may provide transmitted first light 230 and reflected second light 240. In some situations, third linear polarizer 150-3 may reduce the power of transmitted first light 230 and the power of reflected second light 240 prior to providing transmitted first light 230 and reflected second light 240.

As shown in FIG. 2, phosphor assembly 115 may receive transmitted first light 230 and reflected second light 240. In some examples, phosphor assembly 115 may receive transmitted first light 230 and reflected second light 240 via second beamsplitter 140-2, fourth linear polarizer 150-4, and/or collimator lens 170. By causing multiple arrays of lasers to emit light that is provided to phosphor assembly 115, an intensity of light received by phosphor 125 may be significantly increased compared to light received by phosphor 125 from a single laser or from a single array of laser.

Phosphor 125 may perform a light conversion using a combination of transmitted first light 230 and reflected second light 240. For example, phosphor 125 may convert light from blue light to white light. Additionally, phosphor 125 cause the light to be non-coherent light. Accordingly, phosphor 125 may generate (or emit) non-coherent light 250. A brightness of non-coherent light 250 may satisfy a brightness threshold. For example, in example configuration 200 of system 100, a brightness of non-coherent light 250 may be from approximately 700 lumens up to 20,000 lumens in As shown in FIG. 2, collimator lens 170 may receive non-coherent light 250 and may collimate non-coherent light 250 to obtain collimated non-coherent light 260. In some situations, collimated non-coherent light 260 may be received by second beamsplitter 140-2 via fourth linear polarizer 150-4. Second beamsplitter 140-2 may reflect collimated non-coherent light 260. Telephoto lens 130 may receive collimated non-coherent light 260 reflected by second beamsplitter 140-2. Collimated non-coherent light 260 may be received by a first end of telephoto lens 130. The first end may be an end that connects to a camera device. Telephoto lens 130 may focus collimated non-coherent light 260 to obtain focused collimated non-coherent light 270. Telephoto lens 130 may include components that cause light to be focused.

Focused collimated non-coherent light 270 may be output from a second of telephoto lens 130 that is opposite the first end. A diameter of focused collimated non-coherent light 270 may approximately two inches. Additionally, telephoto lens 130 may enable focused collimated non-coherent light 270 to remain focused over a distance that satisfies a distance threshold. For example, focused collimated non-coherent light 270 may remain focused over a distance that may exceed 2 miles.

By light emitted by multiple arrays of lasers, implementations described herein may generate collimated non-coherent light with an intensity that exceeds an intensity of a single laser or of a single array of lasers.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
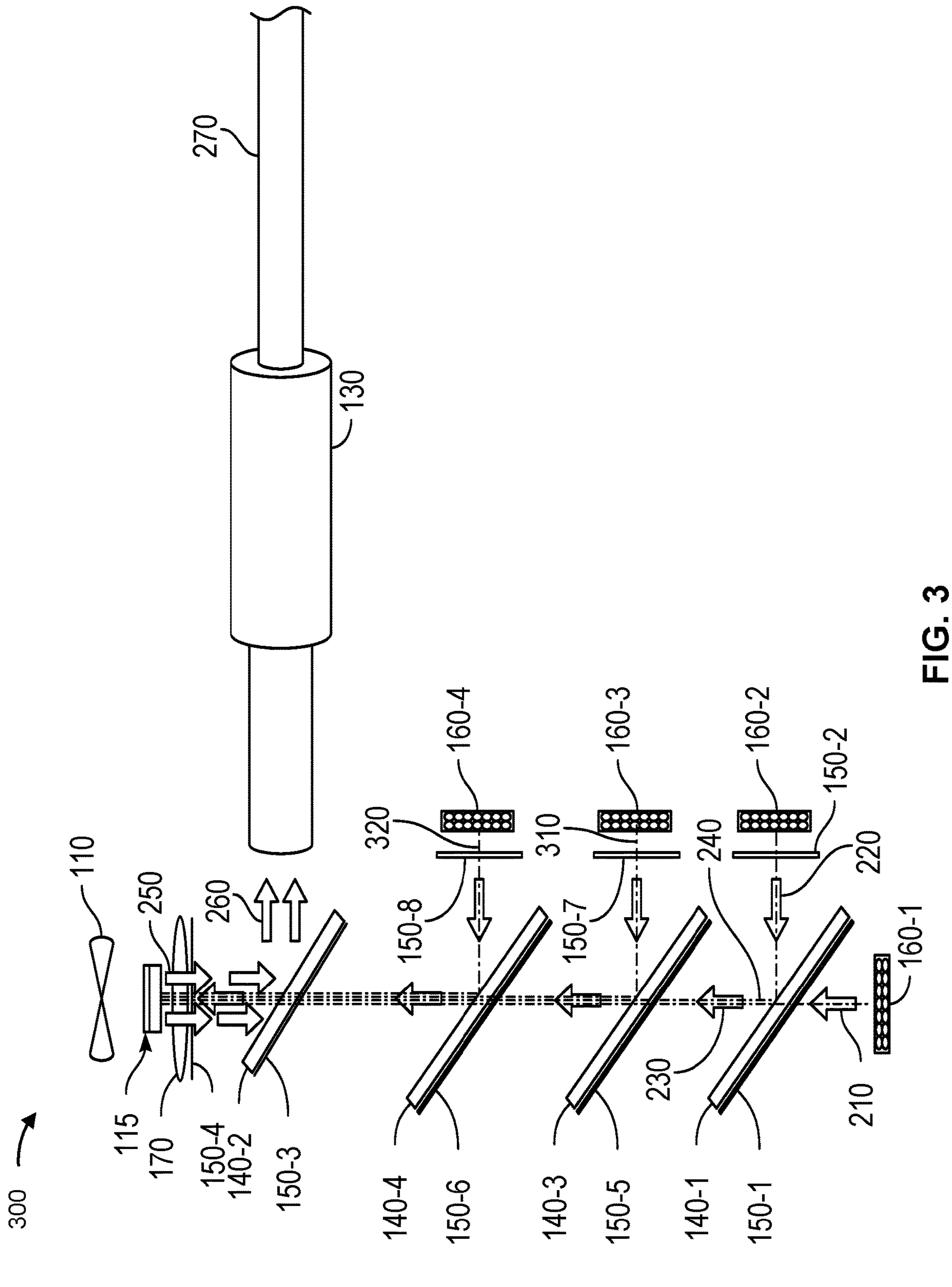
FIG. 3 is a diagram of an example configuration of the example system described herein.

FIG. 3 is a diagram of an example configuration 300 of system 100 described herein. Elements of FIGS. 1 and 2, included in FIG. 3, have been described above. As shown in FIG. 3, system 100 may include additional beamsplitters 140, additional linear polarizers 150, and additional array of lasers 160. As shown in FIG. 3, the elements of FIG. 3 may be provided at various distances from each other. As shown in FIG. 3, a fifth linear polarizer 150-5 and a third beamsplitter 140-3 may be parallel to first linear polarizer 150-1 and first beamsplitter 140-1. A sixth linear polarizer 150-6 and a fourth beamsplitter 140-4 may be parallel to first linear polarizer 150-1 and first beamsplitter 140-1. Fifth linear polarizer 150-5, third beamsplitter 140-3, sixth linear polarizer 150-6, and fourth beamsplitter 140-4 may be provided between first array of lasers 160-1 and phosphor assembly 115.

A seventh linear polarizer 150-7 and an eighth linear polarizer 150-8 may be provided parallel to second linear polarizer 150-2. A third array of lasers 160-3 and a fourth array of lasers 160-4 may be parallel to second array of lasers 160-2. As shown in FIG. 3, third array of lasers 160-3 may emit third light 310. Third light 310 may be provided to third beamsplitter 140-3 via seventh linear polarizer 150-7. Based on fifth linear polarizer 150-5 being provided at an angle with respect to seventh linear polarizer 150-7, third beamsplitter 140-3 may appear as an opaque surface to third array of lasers 160-3. Based on third beamsplitter 140-3 appearing as an opaque surface, second light 220 may be reflected by third beamsplitter 140-3.

As shown in FIG. 3, fourth array of lasers 160-4 may emit fourth light 320. Fourth light 320 may be provided to fourth beamsplitter 140-4 via eighth linear polarizer 150-8. Based on sixth linear polarizer 150-6 being provided at an angle with respect to eighth linear polarizer 150-8, fourth beamsplitter 140-4 may appear as an opaque surface to fourth array of lasers 160-4. Based on fourth beamsplitter 140-4 appearing as an opaque surface, fourth light 320 may be reflected by fourth beamsplitter 140-4.

Third light 310 and fourth light 320 may be combined with first light 210 and second light 220. The combination of light may be provided to phosphor assembly 115 in a manner similar to the manner described above in connection with FIG. 2. In this regard, based on the addition of third light 310 and fourth light 320, a power of the light received by phosphor 125 may exceed the power of the light received by phosphor 125 as described in FIG. 2. Phosphor 125, collimator lens 170, and telephoto lens 130 may process the combination of light in a manner similar to the manner described above in connection with FIG. 2.

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example component may perform one or more functions described as being performed by another set of devices of the example component.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, a "wavelength" is intended to be construed as a range or band of wavelengths perceived as a single color. The actual range of wavelengths will be determined by the capabilities of the light source producing the light.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
- a first array of lasers to emit a first light;
- a first linear polarizer to receive the first light;
- a second array of lasers to emit a second light;
- a second linear polarizer to receive the second light, the second linear polarizer provided at an angle with respect to the first linear polarizer;
- a phosphor assembly positioned in optical communication with the first array of lasers and the second array of lasers to receive the first light and the second light and generate a non-coherent light; and
- a collimator lens to collimate the non-coherent light to obtain collimated non-coherent light.

2. The system of claim 1, further comprising a cooling component adapted to cool the phosphor assembly.

3. The system of claim 1, wherein the phosphor assembly includes a yellow phosphor.

4. The system of claim 1, wherein the first array of lasers is provided at an orthogonal angle with respect to the second array of lasers.

5. A system, comprising:
- a first array of lasers adapted to emit first light;
- a first linear polarizer adapted to polarize the first light, forming polarized first light;
- a second array of lasers adapted to emit second light;
- a second linear polarizer adapted to polarize the second light, forming polarized second light;
- a first beamsplitter, coupled to the first linear polarizer, adapted to:
  - receive the polarized first light from the first linear polarizer and transmit at least a portion of the polarized first light as transmitted first light, and
  - receive the polarized second light from the second linear polarizer and reflect at least a portion of the polarized second light as reflected second light;
- a phosphor assembly adapted to:
  - receive a combination of light comprising the transmitted first light and the reflected second light, and
  - generate, in response to receiving the combination of light, non-coherent light;
- a first lens adapted to receive the non-coherent light and collimate the non-coherent light to generate collimated non-coherent light;
- a second beamsplitter adapted to receive the collimated non-coherent light and reflect at least a portion of the collimated non-coherent light; and
- a second lens adapted to receive the at least a portion of the collimated non-coherent light reflected from the second beamsplitter and output focused collimated non-coherent light.

6. The system of claim 5, wherein:

the transmitted first light and the reflected second light include light of a first color; and the phosphor assembly is adapted to absorb a wavelength of the light of the first color to generate non-coherent light of a second color.

7. A system, comprising:

a plurality of arrays of lasers comprising a first array of lasers to emit a first light and a second array of lasers to emit a second light;

a plurality of linear polarizers comprising a first linear polarizer to receive the first light and a second linear polarizer to receive the second light; and a phosphor assembly to receive a combination light of the first light and the second light and adjust at least one of a wavelength of the combination light or a divergence of the combination light to generate a converted light.

8. The system of claim 7, further comprising a first beamsplitter configured to:

receive the first light and the second light from the plurality of linear polarizers;

transmit at least a portion of the first light as a transmitted first light; and reflect at least a portion of the second light as a reflected second light, the combination light formed by the transmitted first light and the reflected second light.

9. The system of claim 8, further comprising:

a collimator lens configured to receive the converted light and collimate the converted light to obtain collimated converted light;

a second beamsplitter configured to receive the collimated converted light and reflect at least a portion of the collimated converted light; and a telephoto lens configured to:

receive the at least a portion of the collimated converted light reflected by the second beamsplitter, focus the at least a portion of the collimated converted light to obtain focused collimated converted light, and output the focused collimated converted light.

10. The system of claim 9, further comprising:

a cooling component adapted to cool the phosphor assembly; and a third linear polarizer adapted to receive the collimated converted light from the collimator lens and provide the collimated converted light to the second beamsplitter.

11. The system of claim 8, wherein the plurality of linear polarizers include a first linear polarizer to receive the first light, the first linear polarizer coupled to the first beamsplitter.

12. The system of claim 11, wherein the plurality of linear polarizers include a second linear polarizer to receive the second light, the first beamsplitter to appear as an opaque surface to the second linear polarizer.

13. The system of claim 7, wherein the phosphor assembly adjusts the divergence of the combination light and the converted light is non-coherent light.

14. The system of claim 13, wherein the phosphor assembly is adapted to perform light conversion on the first light and the second light to generate the non-coherent light.

15. The system of claim 7, wherein the first light and the second light include light of a first color, the phosphor assembly to adjust the wavelength of the combination light having the first color to generate the converted light to include light of a second color, the second color different from the first color.

16. The system of claim 7, wherein:

the first array of lasers includes a first laser light to emit the first light;

the second array of lasers includes a second laser light to emit the second light; and the first light is emitted at an angle orthogonal to the second light.

17. The system of claim 1, further comprising a first beamsplitter coupled to the first linear polarizer.

18. The system of claim 17, further comprising:

a third linear polarizer to receive the collimated non-coherent light;

a second beamsplitter coupled to the third linear polarizer to receive the collimated non-coherent light and reflect at least a portion of the collimated non-coherent light; and a telephoto lens to receive the at least a portion of the collimated non-coherent light reflected from the second beamsplitter and focus the at least a portion of the collimated non-coherent light reflected to obtain focused collimated non-coherent light.

19. The system of claim 5, further comprising a third linear polarizer positioned between the phosphor assembly and the first beamsplitter, the third linear polarizer adapted to receive the combination of light.

20. The system of claim 5, further comprising a cooling component to cool the phosphor assembly, wherein the phosphor assembly comprises a heatsink component to absorb heat generated by the transmitted first light and the reflected second light.

* * * * *